United States Patent [19]
Andrews, Jr. et al.

[11] Patent Number: 5,558,694
[45] Date of Patent: *Sep. 24, 1996

[54] WOOD-WASTE PRODUCT FORMED

[75] Inventors: William S. Andrews, Jr., Durham; William S. Andrews, III, Creedmoor, both of N.C.

[73] Assignee: B & B Organic Composite and Soils, Inc., Durham, N.C.

[*] Notice: The term of this patent shall not extend beyond the expiration date of Pat. No. 5,435,819.

[21] Appl. No.: 474,110

[22] Filed: Jun. 7, 1995

Related U.S. Application Data

[62] Division of Ser. No. 223,839, Apr. 6, 1994, Pat. No. 5,435,819, which is a continuation of Ser. No. 944,889, Sep. 14, 1992, abandoned, which is a continuation-in-part of Ser. No. 813,364, Dec. 24, 1991, abandoned.

[51] Int. Cl.$^6$ ..................................................... C05F 9/00
[52] U.S. Cl. .................. 71/23; 71/6; 71/903; 405/128; 405/129
[58] Field of Search .................................. 71/69, 11, 13, 71/21, 23, 903, 904; 435/287; 422/184; 405/128, 127

[56] References Cited

U.S. PATENT DOCUMENTS

| | | | |
|---|---|---|---|
| 3,719,314 | 3/1973 | Cox | 225/97 |
| 4,050,917 | 9/1977 | Varro | 71/9 |
| 4,146,382 | 3/1979 | Willisch | 71/9 |
| 4,326,874 | 4/1982 | Burklin | 71/9 |
| 4,420,320 | 12/1983 | Hartmann et al. | 71/13 |
| 4,608,126 | 8/1986 | Watson et al. | 202/84 |
| 5,192,354 | 3/1993 | Drysdale et al. | 71/9 |
| 5,435,819 | 7/1995 | Andrews, Jr. et al. | 71/6 |

OTHER PUBLICATIONS

*National Geographic* May, 1991 article entitled "Once and Future Landfills", pp. 117–134.

Extract from book entitled "Rubbish, The Archeology Of Garbage" by Rathje, Jul. 1992, pp. 110–123, 130, 238–250.

*Primary Examiner*—Ferris Lander
*Attorney, Agent, or Firm*—Olive & Olive, P.A.

[57] ABSTRACT

A low-labor method of treating wood-containing or other cellulosic wastes to form a plant growth product. The wastes are formed into mounds containing soil or sand. Plants are allowed to grow on top of the mounds. When the wood becomes crumbly, the wastes are screened to form the product.

4 Claims, 2 Drawing Sheets

DEPOSITING LOADS OF WOOD-WASTES ON A WASTE-
TREATMENT SITE BY DROPPING THE LOADS AT THE
SITE, FORMING A GENERALLY SMOOTH-TOPPED MOUND

↓

DETERMINING WHETHER SAID MOUND CONTAINS A
PREDETERMINED AMOUNT OF SOIL

↓

ADDING SOIL IF SAID MOUND DOES NOT CONTAIN
SAID PREDETERMINED AMOUNT

↓

ALLOWING VEGETATION TO GROW ON THE MOUND

↓

ALLOWING SAID MOUND TO REMAIN UNDISTURBED

↓

PERIODICALLY SAMPLING THE WOOD-WASTES TO
DETERMINE PRESENCE OF A CRUMBLY TEXTURE OF A
DESIRED PROPORTION OF THE WOOD-WASTES

↓

PUTTING THE WOOD-WASTES THROUGH A SCREEN TO
PRODUCE A MIXTURE OF DRIED WOOD AND SOIL

↓

RECYCLING INTO NEW MOUNDS ANY WOOD WASTES
WHICH DO NOT GO THROUGH THE SCREEN

FIG. 1

WOOD-WASTE PRODUCT FORMED

CROSS-REFERENCE TO RELATED APPLICATIONS

This Application is a division of 08/223,839 Apr. 06 1994 now U.S. Pat. No. which is a FWC of 07/944,889 Sep. 14, 1992 (abandoned) which is a continuation-in-part 07/813,364 Dec. 24, 1991 (abandoned).

BACKGROUND OF THE INVENTION

1. Field of the Invention

This invention relates to methods of treating waste products, primarily silvicultural waste such as stumps and limbs, and to products formed from the treated waste products.

2. Description of the Related Art

Many different disposal and treatment processes have been developed to deal with the large volumes of wastes of various kinds which are produced by humans, some of which processes produce usable products. For example, the patent of Hartmann et al. (No. 4,420,320) provides a method of producing soil conditioners from waste material, such as refuse and sludge. Briquettes of the material are subjected to intense rotting to reduce the water content, and then the briquettes are ground and screened. The smaller particles are used as a soil conditioner and the larger ones are treated by low temperature carbonization or combustion.

Composting methods are often used to treat wastes containing plant matter. Composting results in extreme heating of the material being composted, requires the presence of a significant amount of moisture, and results in a humus-like final product. For example, the composting process of Willisch (U.S. Pat. No. 4,146,382) comprises grinding waste material to bring it to a predetermined size, and then bedding the material in successive self-aerating stacks having a honeycomb tunnel ventilation system, which is actively aerated. The resultant material may be used for compost.

City wastes, which are high in paper content, may be treated by being ground into small pieces, screened, and placed in a digester in layers that are turned over periodically with plowshares and are watered and held to retain a high temperature for the decomposition to proceed (U.S. Pat. No. 4,050,917).

Silvicultural wastes and other arboreal wastes are produced when land is cleared for highways, agriculture, and construction of buildings and other structures. The arboreal wastes produced are generally placed in landfills, bulldozed into unused areas, or burned, and often are not of further use.

Local and state governments have enacted rules to control how and where persons may dispose of such waste materials. For example, the North Carolina Administrative Code currently provides that "demolition landfills", which are defined as landfills that are limited to receiving stumps, limbs, leaves, concrete, brick, wood, uncontaminated earth or other solid wastes as approved, must have the waste placed therein restricted to the smallest area feasible, and must meet other requirements.

The North Carolina Administrative Code further defines "yard wastes", as being limited to stumps, limbs, leaves, grass and untreated wood, and specifies treatment by composting of the wastes. In such facilities, the particle size of the larger trash items such as limbs, trees, and stumps is required by law to be reduced to promote composting. The compost must also be aerated, such as by turning, elevated temperatures must be maintained, and nitrogen bearing waste such as grass clippings must be incorporated to aid in the microbial composting process.

Thus, the primary ways of disposing of many wastes, including the various wood-containing or related wastes, either do not utilize large waste pieces, do not result in a usable product, and/or require substantial labor.

It is therefore an object of this invention to provide a method for disposing of wood-containing wastes.

It is a further object of this invention to provide a method for disposing of wood-containing wastes which is of low labor intensity and does not required the use of grinding before disposal nor the addition of fertilizers or other chemicals.

It is a further object of this invention to provide a method for disposing of wood-containing wastes which produces an end product which may be used as soil to grow plants.

Other objects and advantages will be more fully apparent from the following disclosure and appended claims.

SUMMARY OF THE INVENTION

The invention provides a low-labor method of treating wood-containing or other cellulosic wastes to form a plant growth product. The wastes are formed into mounds, which also contain soil or sand. Plants are allowed to grow on top of the mounds. When the wood content becomes dry and crumbly, the dry wastes are screened to form the product. The method of the invention is referred to as the "dry method" of recycling wood-wastes. Other aspects and features of the invention will be more fully apparent from the following disclosure and appended claims.

BRIEF DESCRIPTION OF THE DRAWINGS

FIG. 1 is a schematic diagram of the method of the invention.

DETAILED DESCRIPTION OF THE INVENTION AND PREFERRED EMBODIMENTS THEREOF

Figure 2:
FIG. 2 is a perspective view of a plurality of mounds formed according to the invention.

The present invention is a dry method of treating wood-wastes using mounds (FIGS. 1–2), and a product produced by said method. Said method comprises:

(a) providing wood-wastes;

(b) providing a waste-treatment site;

(c) depositing loads of said wood-wastes on said waste-treatment site by dropping the loads at the site to form a generally smooth-topped mound;

(d) allowing vegetation to grow on the mound;

(e) allowing said mound to remain undisturbed without artificial aeration, without the addition of chemicals, and without movement of the wood-wastes;

(f) periodically sampling the wood-wastes in the mound to determine when portions of the wood-wastes in the mound are of a crumbly texture; and (g) when a crumbly texture is determined, screening the waste in said mound to remove large pieces and to produce a granular mixture of dried wood and soil.

Preferably, no water is added to the mounds except for natural rainfall; however, in particularly dry areas water may optionally be added to enable the vegetation to grow on the mounds.

As used herein, the term "wood-wastes" means at least one of the following: stumps, limbs, branches, tree trunks, and whole trees. Although the preferred embodiments of the invention utilize primarily the above-listed wood-wastes, the method of the invention may also be used with wood chips, leaves, and other organic, and preferably cellulosic, material, preferably along with greater quantities of wood-wastes. Preferably, the amount of wood chips used is minimal because of the acidity of the wood chips. Other cellulosic, plant derived wastes may be used in addition to or instead of wastes obtained from trees, and are included in the term "wood-wastes" in the broad practice of the invention.

The wood-wastes are preferably taken from sites having uprooted tree trunks having dirt on them, trees, branches, brush and other debris, and are loaded into trucks and then dumped on top of or next to previous loads. The wood-wastes are not ground prior to placing them in the mounds, which would tend to create an anaerobic mound of small pieces of wood, but rather, the wood-wastes, preferably containing large stumps and other large pieces of wood, and dirt, are dumped on the ground and then loosely piled into mounds and allowed to remain there without disturbance. Large wood pieces thus are not removed from the waste.

The cumulative loads form a large mound, which is preferably about 10–12 feet high. One advantage of having a great depth to the mound is that when it rains, the water usually does not go all of the way into the mound, with the result that the lower portions remain dry. Thus, the method of the invention does not result in leaching. Another advantage of having high mounds is that more waste can be placed at a site.

The mound is preferably in the form of a long windrow, which may be, for example, about 80–300 feet long and about 80 feet wide, or any other dimension suitable for the waste-treatment site. Thus, for example, about 800 loads of 10 cubic yards each may be placed in a windrow. The actual size of the mound, however, does not matter so long as it allows most of the material in the mound to dry. Preferably the top of the mound is essentially flat or generally flat, and does not form valleys for water to gather in nor peaks upon which it is difficult to grow plants. Roads between the windows about 30 feet wide allow maneuvering of machinery to add loads to the mound, and later, to remove loads for screening.

In the preferred embodiment of the invention, no chemicals, fertilizers or liquids are added to the mounds, because such additions are not necessary to the invention. Also, it is clear that such additions may in fact be harmful to the environment, and depending on the chemical could interfere with the use of the final product.

It is critical to the invention that soil or sand be present in and/or on the mounds. This soil or sand preferably comes from the roots of the trees, or may be added to the mound during formation of the mound. If not already present, the preferred additive is sand, which does not retain water, but easily allows water to drain through it and which is added at a volume of about 5–10% of the volume of the mound during mound formation.

Growing plants or seeds are optionally placed on the mound so that plants begin to grow on top of the mound. This same process happens a bit more slowly if no seeding is done by the operator, but it does occur, so that a significant vegetation mass forms on top of the mound.

The mound is allowed to sit unattended without further treatment for a period of anywhere from about 6 months to about 2 to 5 years. Generally, even relatively large logs reach a crumbly stage after 2–3 years in a mound prepared according to the invention. During this period, the mound does not heat up as in composting, nor is heat required or used to form the product of the invention. Thus, unlike a compost pile, these mounds when disturbed show no evidence of heat or fermentation. As further evidence of the difference between the two processes, the pH of the final product formed according to the invention herein is not acid, but rather is generally about 6.25 to 6.40.

The mounds are inspected periodically by removing a load or a portion of a load to determine whether the chunks of wood in the mound are dry and flake or crumble apart when handled. Any time after a desired portion of the wood in the mound has reached this crumbly stage, which may be for example, when 50% or more of the chunks of wood have reached this stage, loads of the wood-waste are dumped onto a shaking screen. Preferably the screen used is a screen such as the Read Screen-All (Read Corporation, Middleboro, Mass.), with a preferable mesh size of 2 ¼ inch for the top screen and 1-inch for the lower screen; however, different size screens may be used for different textures of final product. Successive loads of wood-waste from the mound are dumped on to the screen. Pieces too large to fit through the screen fall off the screen away from the mound of screened material.

The large pieces of wood remaining after the screening, which were not broken apart into small pieces during the screening process, are placed into new mounds which are treated in the same way as the initial mounds to recycle the larger pieces through another drying sequence. Herbaceous plants and bushes which have grown on top of the initially harvested mounds may be moved to the new mounds and allowed to take root. Alternatively, or in addition, the new mounds may be seeded or allowed to seed naturally.

The method of the invention generally yields about 50%–90% of the number of loads of soil product as were used of wood-waste, primarily because of the great amount of air space in the mounds. If leaves are used, a lower volume of soil results, generally about 30% of the original volume.

If the mounds which formed the final product were essentially all plant material, and absolutely no soil, or very little soil is present on or within the material placed in the mounds, sand may be added to the dry wood-waste final product.

The texture and quality of the final product are similar to high quality soil. The final product contains the actual soil which was in the mound plus finely textured dry wood particles. The final wood-soil mixture may be used for topsoil, high quality organic soil, potting soil, garden beds, or as an additive to soil products containing other organic matter, sand, sawdust, cotton yarn waste, bark fines, sludge, etc. so long as the material being added to is not contaminated in a manner to make it undesirable for use in a soil product.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A wood-waste product containing dry wood particles of substantially uniform size and soil particles produced by a dry method for disintegrating relatively large, unbroken, unground wood-wastes such as stumps, limbs, branches, tree trunks and whole trees, and which operates in ambient temperature consisting essentially of:

(a) providing unbroken, unground wood-wastes having at least some associated soil;

(b) providing a waste-treatment site;

(c) depositing loads of said unbroken, unground wood-wastes on said waste-treatment site by dropping the loads including any soil associated therewith at the site to loosely pile said wood-wastes and form an uncovered mound of sufficient height to permit a lower internal portion of said mound to remain substantially dry in the presence of rainfall at the site and shaped to facilitate vegetation growth and avoid rainfall water collection thereon;

(d) enhancing the said dry method of disintegrating by allowing vegetation growth to permeate the uncovered surface of the mound to form a vegetation mass thereon;

(e) insuring that said unbroken, unground wood-wastes within said mound remain undisturbed and unturned for a period within a range of six months to five years without artificial aeration, without the addition of heat, without chemical treatment, in a condition which does not generate heat within the mound and without movement or breaking of the wood-wastes forming the mound until portions of the wood-wastes in the mound are of a desired dry and crumbly texture;

(f) periodically sampling the wood-wastes in the mound to determine when portions of wood in the wood-wastes in the mound are of a desired dry and crumbly texture; and (g) when a desired dry and crumbly texture is determined to be present, screening the waste in said mound to form a collection of large unbroken pieces remaining as oversize on the screen and a screened out collection of granular material forming a non-composted wood-waste product containing dry wood particles of uniform size compatible with the size of the screen and soil particles making up at least a portion of said wood-waste product.

2. A wood-waste product produced by the method of claim 1 and wherein said method further consists of adding sand to said wood-wastes at a selected step in said method.

3. A wood-waste product containing substantially small dry wood particles of less than some predetermined size and soil particles produced by a dry method for disintegrating relatively large, unbroken, unground wood-wastes such as stumps, limbs, branches, tree trunks and whole trees and which operates in ambient temperature consisting essentially of:

(a) providing unbroken, unground wood-wastes having at least some associated soil;

(b) providing a waste-treatment site;

(c) depositing loads of said unbroken, unground wood-wastes on said waste-treatment site by dropping the loads including any soil associated therewith at the site to loosely pile said wood-wastes and form an uncovered mound of sufficient height to permit a lower internal portion of said mound to remain substantially dry in the presence of rainfall at the site and shaped to facilitate vegetation growth and avoid rainfall water collection thereon;

(d) enhancing the said dry method of disintegrating by allowing vegetation growth to permeate the uncovered surface of the mound to form a vegetation mass thereon;

(e) insuring that said unbroken, unground wood-wastes within said mound remain undisturbed and unturned for a period within a range of six months to five years without artificial aeration, without the addition of heat, without chemical treatment, in a condition which does not generate heat within the mound and without movement or breaking of the wood-wastes forming the mound until portions of the wood-wastes in the mound are of a desired dry and crumbly texture;

(f) periodically sampling the wood-wastes in the mound to determine when portions of wood in the wood-wastes in the mound are of a desired dry and crumbly texture; and (g) when a desired dry and crumbly texture is determined to be present, separating the waste in said mound to form a collection of large unbroken oversize pieces and a collection of granular material forming a non-composted wood-waste product containing substantially small dry wood particles of less than some predetermined size and soil particles making up at least a portion of said wood-waste products.

4. A wood-waste product produced by the method of claim 3 and wherein said method further consists of adding sand to said wood-wastes at a selected step in said method.

\* \* \* \* \*

UNITED STATES PATENT AND TRADEMARK OFFICE
CERTIFICATE OF CORRECTION

PATENT NO. : 5,558,694
DATED : September 24, 1996
INVENTOR(S) : William S. Andrews, Jr. and William S. Andrews, III It is certified that error appears in the above-indentified patent and that said Letters Patent is hereby corrected as shown below:

Correct the title on the title page to read --"WOOD-WASTE PRODUCT FORMED BY METHOD OF TREATING WOOD WASTES--.

Column 1, line 6, insert --5,435,819-- after "No.".

Correct the title in Column 1 to read --"WOOD-WASTE PRODUCT FORMED BY METHOD OF TREATING WOOD WASTES--.

Signed and Sealed this

Fifteenth Day of April, 1997

Attest:

BRUCE LEHMAN

Attesting Officer          Commissioner of Patents and Trademarks